US010971195B2

(12) United States Patent
Kraus et al.

(10) Patent No.: US 10,971,195 B2
(45) Date of Patent: Apr. 6, 2021

(54) CAVITY SEAL AND MOISTURE CONTROL

(71) Applicant: Seagate Technology LLC, Cupertino, CA (US)

(72) Inventors: Maxwell R. Kraus, Clear Lake, MN (US); Paul A. Beatty, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 446 days.

(21) Appl. No.: 16/110,763

(22) Filed: Aug. 23, 2018

(65) Prior Publication Data

US 2020/0066308 A1 Feb. 27, 2020

(51) Int. Cl.
*B01D 53/22* (2006.01)
*G11B 33/14* (2006.01)
*B01D 53/26* (2006.01)

(52) U.S. Cl.
CPC ........ *G11B 33/1453* (2013.01); *B01D 53/261* (2013.01); *B01D 53/268* (2013.01)

(58) Field of Classification Search
CPC . B01D 53/268; B01D 53/261; G11B 33/1453
See application file for complete search history.

(56) References Cited

U.S. PATENT DOCUMENTS

| | | | | |
|---|---|---|---|---|
| 2,388,134 A * | 10/1945 | Flosdorf | ................... | A61J 3/00 34/299 |
| 2,603,215 A * | 7/1952 | Arnow | ............... | A61M 15/0033 128/203.15 |
| 2,964,809 A * | 12/1960 | Gwyn | ..................... | E06B 3/677 52/172 |
| 3,238,160 A * | 3/1966 | Hensen | ................ | C09D 161/26 524/542 |
| 3,378,715 A * | 4/1968 | Thornton, Jr. | ......... | H05B 33/22 313/509 |
| 3,527,389 A * | 9/1970 | Farmer | ................... | C08L 83/04 222/327 |
| 4,620,248 A | 10/1986 | Gitzendanner | | |
| 5,590,001 A * | 12/1996 | Ino | ....................... | G11B 25/043 360/97.18 |
| 7,538,972 B2 * | 5/2009 | Burts-Cooper | ...... | G11B 33/121 141/4 |
| 8,238,054 B2 | 8/2012 | Kim et al. | | |
| 8,760,797 B1 | 6/2014 | Beatty et al. | | |
| 8,885,289 B2 * | 11/2014 | Brown | ................ | G11B 25/043 360/97.16 |

(Continued)

*Primary Examiner* — Anthony R Shumate
(74) *Attorney, Agent, or Firm* — Faegre Drinker Biddle (57) ABSTRACT

Aspects of the disclosure are directed to apparatuses and methods involving a desiccant chamber and related componentry, as may be utilized for controlling humidity in electrical enclosures. As may be consistent with one or more embodiments, an environmental control module (ECM) includes a desiccant chamber with a desiccant material therein, first and second membranes in a pathway extending from the desiccant chamber and through respective openings in the ECM, and a gasket and enclosure on the ECM which seal the pathway. A seal in the pathway seals the opening in ECM leading to the first membrane and desiccant chamber during evacuation and fill of an electrical enclosure in which the ECM may be employed, and can be broken to couple the desiccant to the electrical enclosure.

20 Claims, 7 Drawing Sheets

(56) References Cited

U.S. PATENT DOCUMENTS

| | | | |
|---|---|---|---|
| 10,424,336 B1* | 9/2019 | Kraus | G11B 25/043 |
| 10,679,680 B2* | 6/2020 | Fitzgerald | G11B 33/027 |
| 2004/0144474 A1* | 7/2004 | Drummond | B65D 51/30 |
| | | | 156/73.1 |
| 2011/0060246 A1* | 3/2011 | List | A61B 5/15146 |
| | | | 600/583 |
| 2013/0114163 A1* | 5/2013 | Brown | B01D 53/28 |
| | | | 360/97.22 |

\* cited by examiner

CAVITY SEAL AND MOISTURE CONTROL

OVERVIEW

Various types of circuitry and mechanical components benefit from operation in a controlled environment. For instance, temperature, humidity, and chemical interaction may affect electronic and/or mechanical devices. Controlling an environment, however, can be difficult or expensive with regard to manufacturing and long-term use. Further, failure to properly control an environment can adversely affect the performance or lifetime of various components.

One type of component that is susceptible to issues relating to its environment is a disc drive, which is used for data storage in modern electronic products ranging from digital cameras to computer systems and networks. A disc drive may include a mechanical portion, or head disc assembly (HDA), and electronics in the form of a printed circuit board assembly (PCBA), mounted to an outer surface of the HDA. The PCBA controls HDA functions and provides an interface between the disc drive and its host. An HDA includes moving parts such as one or more magnetic discs affixed to a spindle motor assembly for rotation at a constant speed, an actuator assembly supporting an array of read/write heads that traverse generally concentric data tracks radially spaced across the disc surfaces and a voice coil motor (VCM) providing rotational motion to the actuator assembly. In operation, the magnetic-recording disc rapidly rotates by the spindle motor to access (read and/or write) the data stored on the disc.

In certain electrical enclosures, such as those involving a disc drive, the enclosure is evacuated, filled with a gas, and sealed after some or all internal manufacturing steps have been carried out. In order to carry out these steps, a seal is often used between componentry and as part of a pathway utilized for carrying out the evacuation and filling. However, such a seal can rupture during the evacuation and fill process, causing contamination of internal componentry. Further, certain seals may include materials that can outgas into the internal componentry, and may be relatively expensive. An environmental control module (ECM) housing may allow for an internal desiccant tablet to rattle/vibrate which may cause position error signal (PES) margin loss.

The above challenges can result in issues relating to manufacturing, implementation and longevity for electronic circuitry such as disc drives and a variety of other components.

As may be implemented in accordance with one or more embodiments, an apparatus includes a chamber and a desiccant material contained within the chamber, a gas channel, first and second membranes and a seal. The gas channel extends from a first end adjacent the chamber to a second end. The first membrane is at the first end of the gas channel and configured and arranged to facilitate permeation of moisture-laden gas to and from the chamber. The second membrane is at the second end of the gas channel and configured and arranged to facilitate permeation of moisture-laden gas into and out of the gas channel for controlling humidity within an enclosure environment. The seal is configured and arranged with the first and second membranes to provide, in a first state, a seal in the gas channel that prevents the permeation of gas between the chamber and the enclosure environment, and to permit, in a second state in which the seal is punctured, the permeation of gas between the chamber and the enclosure environment, via the respective first and second membranes.

In accordance with another embodiment, an apparatus includes an ECM, a gasket on an upper surface of the ECM and an enclosure cover on the gasket. The ECM includes a desiccant chamber having a desiccant material therein, and a first membrane in a pathway extending from the desiccant chamber through a first opening on an upper surface of the ECM, for passing moisture between the first opening and the desiccant chamber. A second membrane is remote from the first membrane and extends in a portion of the pathway from the second membrane to a second opening on the upper surface of the ECM, for passing moisture between the pathway and circuitry external to the ECM via the second opening. A seal is located at the upper surface of the ECM and is configured and arranged to seal the desiccant chamber and the first membrane in a portion of the pathway extending from the desiccant chamber. The gasket extends around the respective openings in the upper surface, and the enclosure cover operates with the gasket to seal the pathway between the desiccant chamber and the second membrane Various method-based embodiments may be employed in connection with one or more apparatuses as noted herein or otherwise, such as those noted above. In accordance with such an embodiment, an enclosure is provided with a data storage medium therein, and an ECM is provided in the enclosure. The ECM includes a desiccant chamber having a desiccant material therein, and a first membrane in a pathway extending from the desiccant chamber through a first opening on an upper surface of the ECM, the first membrane being configured and arranged to pass moisture between the first opening and the desiccant chamber. A second membrane is provided remote from the first membrane and extending in a portion of the pathway extending from the second membrane to a second opening on the upper surface of the ECM, the second membrane being configured and arranged to pass moisture between the pathway and circuitry external to the ECM via the second opening. The second membrane may also be utilized to ensure that desiccant particles are not expelled to other parts of the ECM, by effectively encapsulating the desiccant. A seal is formed at the upper surface of the ECM to seal the desiccant chamber and the first membrane in a portion of the pathway extending from the desiccant chamber, and a gasket is provided on the upper surface of the ECM and extending around the respective openings therein. An enclosure cover is used to seal the enclosure, and via the gasket, defines and seals the pathway between the desiccant chamber and the second membrane. In some implementations in which the enclosure cover includes an opening positioned with a perimeter of the gasket, the enclosure is evacuated and filled by exhausting gas from the enclosure via the opening and the second membrane, and subsequently filling the enclosure with an inert gas. The seal at the upper surface of the ECM is used to prevent permeation of gas or humidity into or out of the desiccant chamber, before and/or during evacuation, filling or both, and may also be used to prevent moisture from ingressing into the desiccant. After evacuating and/or after filling the enclosure, a permeability path is created between the desiccant chamber and the enclosure by puncturing the seal. The opening in the enclosure cover is then sealed. For instance, a punch may be inserted via the opening in the enclosure cover and extended through the seal without contacting the punch to the first membrane.

The above overview is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, as depicted herein.

FIGS. 1A-1D show cut-away views of an apparatus as may be implemented in accordance with one or more embodiments, in which:

FIGS. 2A-2C show an apparatus at various stages of operation involving puncturing of a desiccant chamber seal and evacuation and fill processes, as may be implemented in accordance with one or more embodiments, and in which:

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving enclosures for componentry, such as electrical componentry, for which humidity control is desirable. In certain implementations, aspects of the present disclosure have been shown to be beneficial when used in the context of providing gas pathways for evacuation, fill and sealing steps, with long-term humidity control after the sealing step. In the contexts of particular embodiments, a penetrable seal is used to seal a desiccant material during various manufacturing steps, and is punctured relative to an evacuation and subsequent sealing process. Various such apparatus or method-based embodiments may be amenable to utilization with electronic componentry and enclosures, such as those involving the manufacture of hard disc drives. While not necessarily so limited, various aspects may be appreciated through a discussion of examples using such exemplary contexts.

Various embodiments involve utilization of an ECM (environmental control module) with a diffuser seal that keeps the ECM's desiccant dry until the seal is broken or otherwise removed, for implementation of the ECM. Such an approach may be beneficial for keeping the desiccant dry during manufacturing (e.g., while on a clean room floor in electronics manufacture). The seal may, for example, hermetically seal the desiccant while an electronic enclosure is being manufactured, and then be punctured before the enclosure is evacuated of air, as may be applicable to the manufacture of hard disc drives. In certain instances such as those in which the enclosure is filled with an inert gas such as helium after evacuation, the seal may be broken before or after evacuation, and either before or after filling with the inert gas. Such embodiments may involve, for example, utilization of a punch that is integrated within an evacuation and fill apparatus. These approaches can be used to address problems such as those noted above, relating to diffuser seals.

In various embodiments, an aluminum foil seal is used to seal an opening into a desiccant housing to prevent moisture from entering the housing and desiccant during cleanroom and manufacturing processes. Once the foil is pierced, such as immediately before an evacuation and fill process, the desiccant is free to communicate with moisture internal to a connected cavity. In some implementations, communication of moisture along a path between the desiccant housing and internal cavity is carried out through two layers of PTFE membrane located along the path. One of the membranes is located near the desiccant and is sealed by the aluminum foil seal (prior to its puncture), and the other membrane is located in a path utilized for the evacuation and fill process. The membranes may be welded to the housing.

In a more particular embodiment, a gasket such as a form-in-place-gasket (FIPG) is positioned between an upper surface of the ECM as noted above and a cover (e.g., as part of the cover). The gasket provides a seal around openings in the upper surface, one of which facilitates evacuation and fill, and the other of which extends into the desiccant housing upon puncture of the seal. The cover is pressed to a top portion of the gasket, sealing the gasket between the lid and the upper surface of the ECM and forming a channel through the openings and into desiccant housing. The cover may, for example, seal an electronic cavity in which the ECM is located and utilized for humidity control. When an evacuation and fill nozzle is placed on an opening in the cover located over a region sealed by the gasket, gas may be evacuated from such an electronic cavity, followed by filling (e.g., with helium), which can be effected via the membrane noted above. A seal as utilized to seal desiccant herein can be removed before evacuation and fill, after evacuation but before fill, or after both evacuation and fill have been carried out.

As may be implemented in accordance with one or more embodiments, an apparatus includes a chamber containing a desiccant material, a gas channel leading from the desiccant material at a first end of the channel, past a first and second membranes and a seal to a second end of the channel. A moisture level can be controlled for an enclosure at a second end of the gas channel. The first membrane is located at the first end of the gas channel and facilitates permeation of moisture-laden gas to and from the chamber. The second membrane is at the second end of the gas channel and facilitates permeation of moisture-laden gas into and out of the gas channel, such as for controlling humidity within an enclosure environment. The seal operates to seal the desiccant in the chamber in a first state, which prevents moisture from being accumulated by the desiccant. In a second state (e.g., where the seal is broken or otherwise intentionally compromised, such as by a mechanical punch that may be part of the apparatus), the seal allows gas permeation between the chamber and the second end of the channel, via the respective first and second membranes. Such approaches may, for example, involve a hard disc drive enclosure that houses the chamber, gas channel, membranes and seal, and includes related components such as a hard disc drive, read/write head and other components utilized in hard disc drives.

The first state as noted above may facilitate evacuation of the chamber, and can be effected via a port in the apparatus. For instance, pathways to the first and second membrane may be via openings in an upper surface that enclosed the chamber and extends laterally therefrom. Such structure may, for example, be part of an environmental control module (ECM) having the upper surface, with the seal affixed thereto. A gasket may be placed around the openings, and a cover thereupon. A port in such a cover can be used for evacuation and fill. The port may also be used for inserting a mechanical punch that breaks the seal. For instance, the first membrane may be located between the seal and the chamber. A pathway thereof may have a length and width that accepts such a mechanical punch that is passed through the seal for puncturing the seal, where the first membrane is offset from the seal by a distance that prevents contact of the punch with the first membrane.

In a particular embodiment, an ECM is implemented as above, with a lower surface that defines a portion of the chamber in which the desiccant resides. The lower surface includes protrusions extending from the lower surface into the chamber. These protrusions can be utilized to engage with the desiccant to fix the desiccant in place. Such protrusions may be utilized in this regard, in a variety of manners with chambers as characterized herein.

In accordance with another embodiment, an apparatus includes an ECM, a gasket on an upper surface of the ECM and an enclosure cover on the gasket. The ECM includes a desiccant chamber having a desiccant material therein. The upper surface of the ECM has two openings, one of which defines a pathway into the desiccant chamber via a first membrane, and the other one of which defines a pathway for extending into an enclosure, via a second membrane. A seal is located over the first opening in the upper surface of the ECM, and seals the desiccant chamber. The gasket extends around the respective openings in the upper surface, and the enclosure cover operates with the gasket to seal the pathway between the desiccant chamber and the second membrane. Upon rupture of the seal, the desiccant is exposed and a pathway is created therewith, between the desiccant and the enclosure, via the respective membranes.

The enclosure cover may be provided with an opening therein, within the perimeter of the gasket, for evacuating the chamber, filling the chamber and, in some instances, puncturing the seal. Accordingly, an evacuation and fill path is provided from the opening in the enclosure cover, past the gasket, through the second opening in the upper surface ECM and through the second membrane. When the seal operates in a broken state with the enclosure cover in place, a sealed pathway extends from the desiccant in the desiccant chamber, respectively through the first membrane, the first opening, an area between the upper surface of the ECM and enclosure cover sealed by the gasket, the second opening and the second membrane. An external seal may hermetically seal the opening in the enclosure cover, after the seal on the upper surface of the ECM has been broken, and to therein seal the pathway between the first and second openings in the upper surface of the ECM. In certain implementations, the upper surface of the ECM has a recessed region extending around the first and second openings in the upper surface, and the gasket extends into the recessed region which forms a perimeter around a sealed region between the upper surface of the ECM and the enclosure cover.

The channels may be implemented in a variety of manners. In some embodiments, the ECM includes a first channel portion of the pathway having a sidewall that extends upward from an inner surface of the desiccant chamber to the first opening in the upper surface of the ECM. The first membrane is within the first channel portion, which has a length sufficient to permit puncturing of the seal on the upper surface of the ECM without contacting the first membrane. The ECM may further include a second channel portion of the pathway having a sidewall that extends downward from the second opening in the upper surface of the ECM to the second membrane, which facilitates the passage of gas between the second channel portion with the sidewall and across the second membrane into an enclosure in which the ECM is mounted.

Various method-based embodiments may be employed in connection with one or more apparatuses as noted herein or otherwise. For instance, an ECM as characterized above can be provided in an electrical enclosure such as a hard disc drive enclosure. A membrane in the ECM is used to pass air or other gas out of the enclosure while a desiccant chamber in the ECM is filled. Thereafter, the enclosure may be filled. To facilitate moisture control after evacuation, a seal in the ECM is broken, extending a path into the desiccant chamber. For instance, a punch may be inserted via the opening in the enclosure cover and extended through the seal without contacting the punch to the first membrane.

Turning now to the figures, FIGS. 1A-1D show cut-away views of an apparatus 100, as may be implemented in accordance with one or more embodiments. Beginning with FIG. 1A, a perspective view of the apparatus 100 is shown having an enclosure 110 with an ECM 120 therein. The ECM 120 has a desiccant chamber 121 that includes a desiccant material, and respective openings 122 and 123 in an upper surface of the ECM. A gasket 124 is formed around the openings on the upper surface of the ECM, and a seal 125 is utilized to seal the opening 123 at the upper surface. Membranes 126 and 127 are respectively in paths into the desiccant chamber 121, and out of the ECM (into the enclosure 110). Various other componentry, such as hard disc drive componentry, is shown within the enclosure 110 by way of example.

Figure 1A:
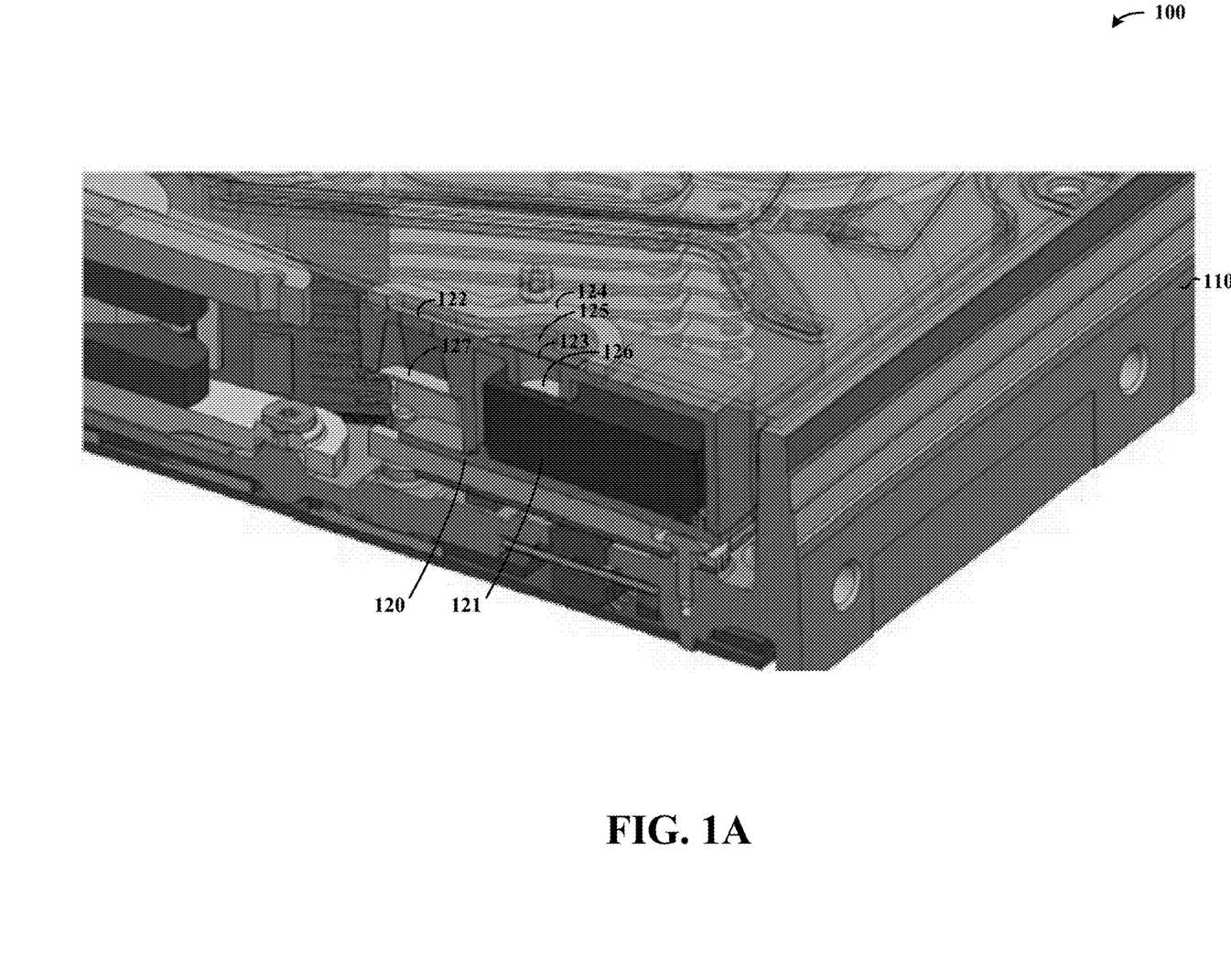
FIG. 1A shows a perspective view.
Figure 1B:
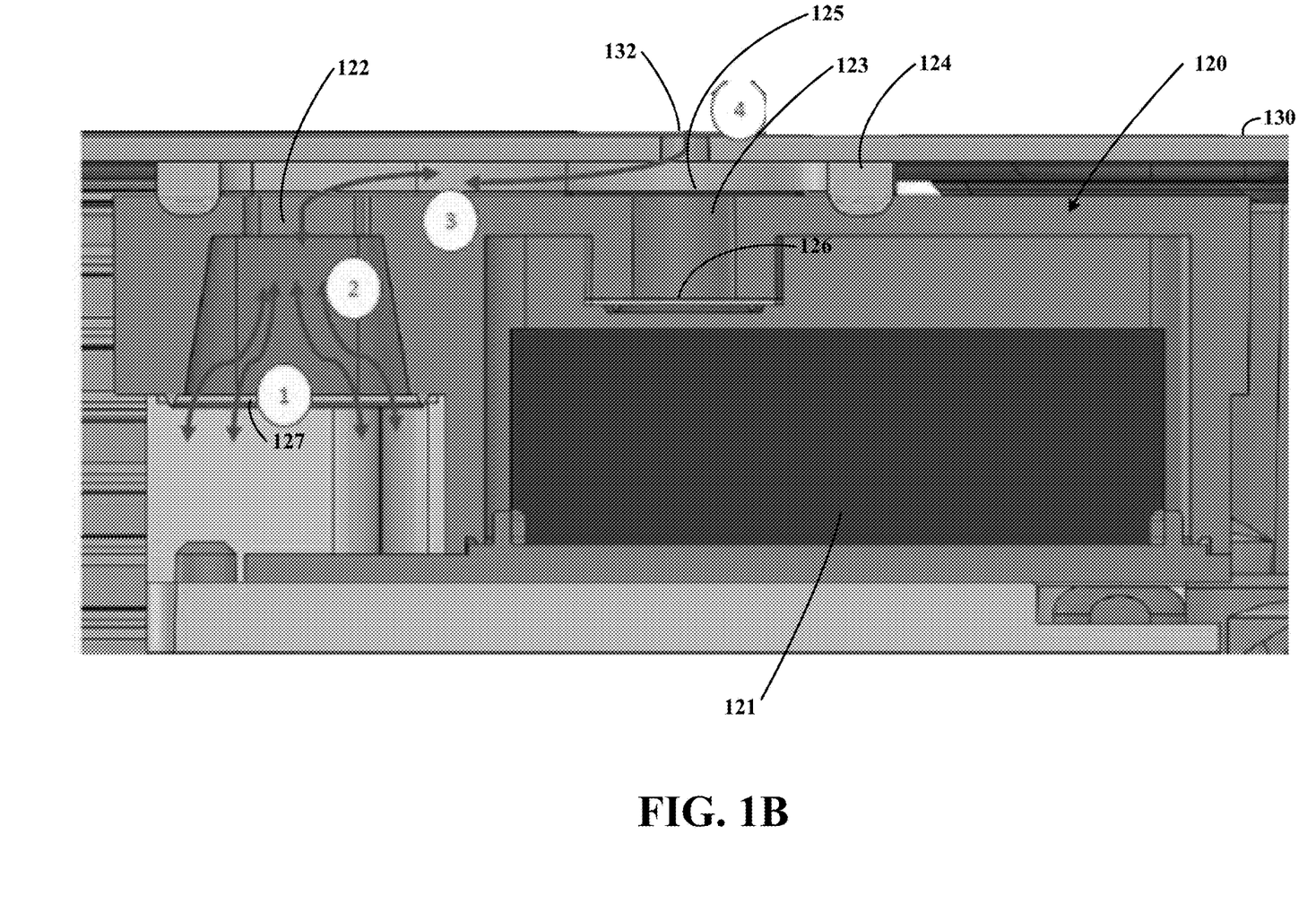
FIG. 1B shows a side view and related flow for evacuation and fill processes involving the enclosure.

FIG. 1B shows a side view and related flow for evacuation and/or fill processes involving the ECM 120, as may be implemented in various embodiments. The seal 125 is shown intact, for preventing gas and/or moisture from flowing into or out of the desiccant 121 via opening 123. An upper cover 130 with an opening 132 therein is shown sealing a region on the upper surface of the ECM within the perimeter of the gasket 124. By way of example, the gasket 124 is shown with a portion thereof compressed onto the upper surface of the ECM 120 to create a gas-tight seal.

For evacuation, air or other gas within the enclosure 110 is drawn past the membrane 127 at 1, through the opening 122 at 2, through the area sealed by the gasket 124 and upper cover 130 at 3, and out of the opening 132 at 4. For fill, the flow path is reversed. In some implementations, the seal 125 is broken during the fill process, which allows the gas being filled to communicate with the desiccant 121.

Figure 1C:
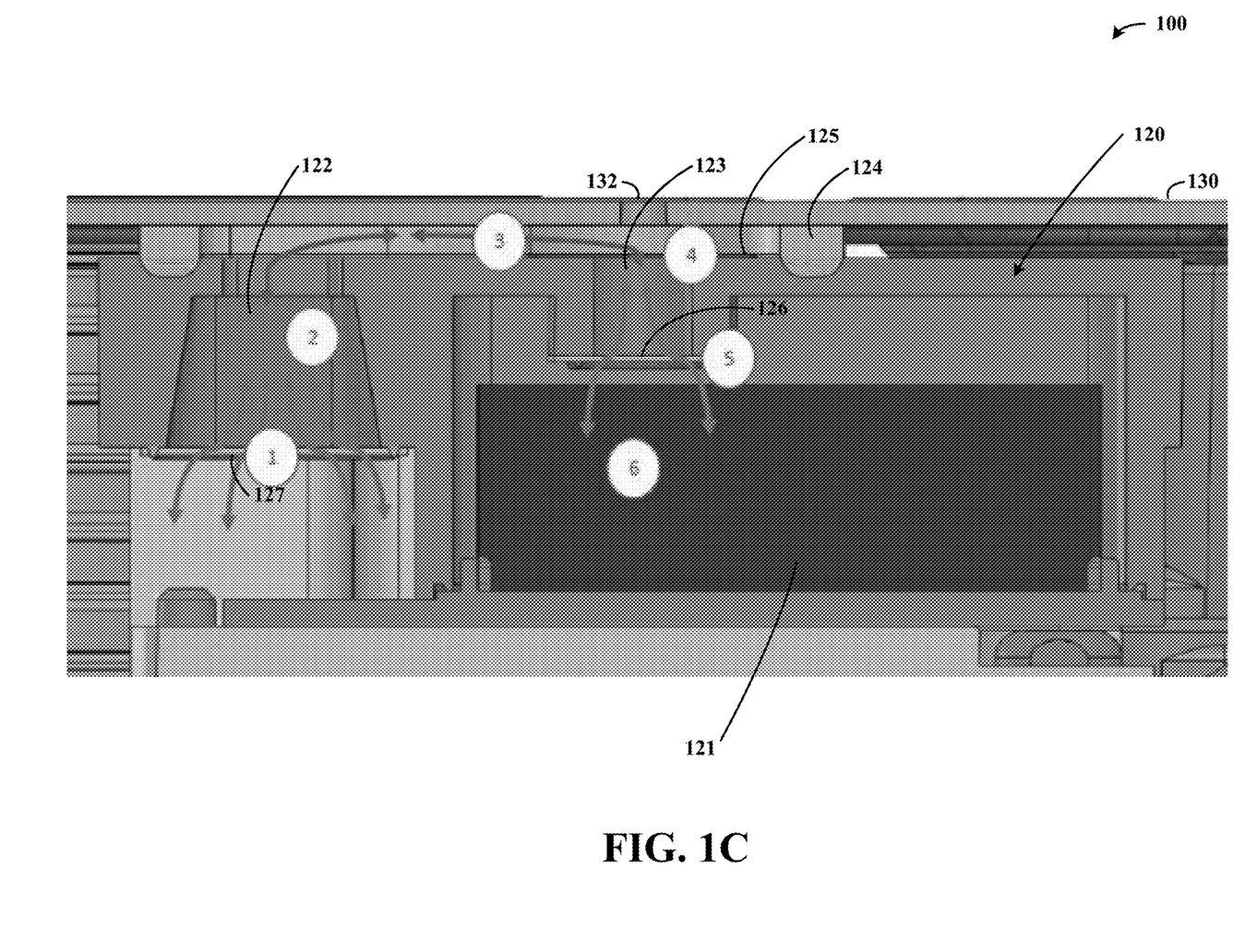
FIG. 1C shows a side view and related flow between a chamber having a desiccant and an enclosure.

FIG. 1C shows a side view of the ECM 120 and related flow between the chamber having the desiccant 121 and the enclosure 110, with the seal 125 having been punctured. A further seal may be placed on the opening 132. Accordingly, moisture is removed from, or added to, the enclosure 110 from the desiccant 121. For instance, moisture may pass from within the enclosure 110 via membrane 127 at 1, through the opening 122 (at 2) and area sealed by the gasket 124 and upper cover 130 (at 3), past the ruptured seal 125 and into the opening 123 at 4, and via membrane 126 (at 5) and into the desiccant (at 6). The process is reversed if the enclosure 110 has lower humidity than that of the desiccant 121.

Figure 1D:
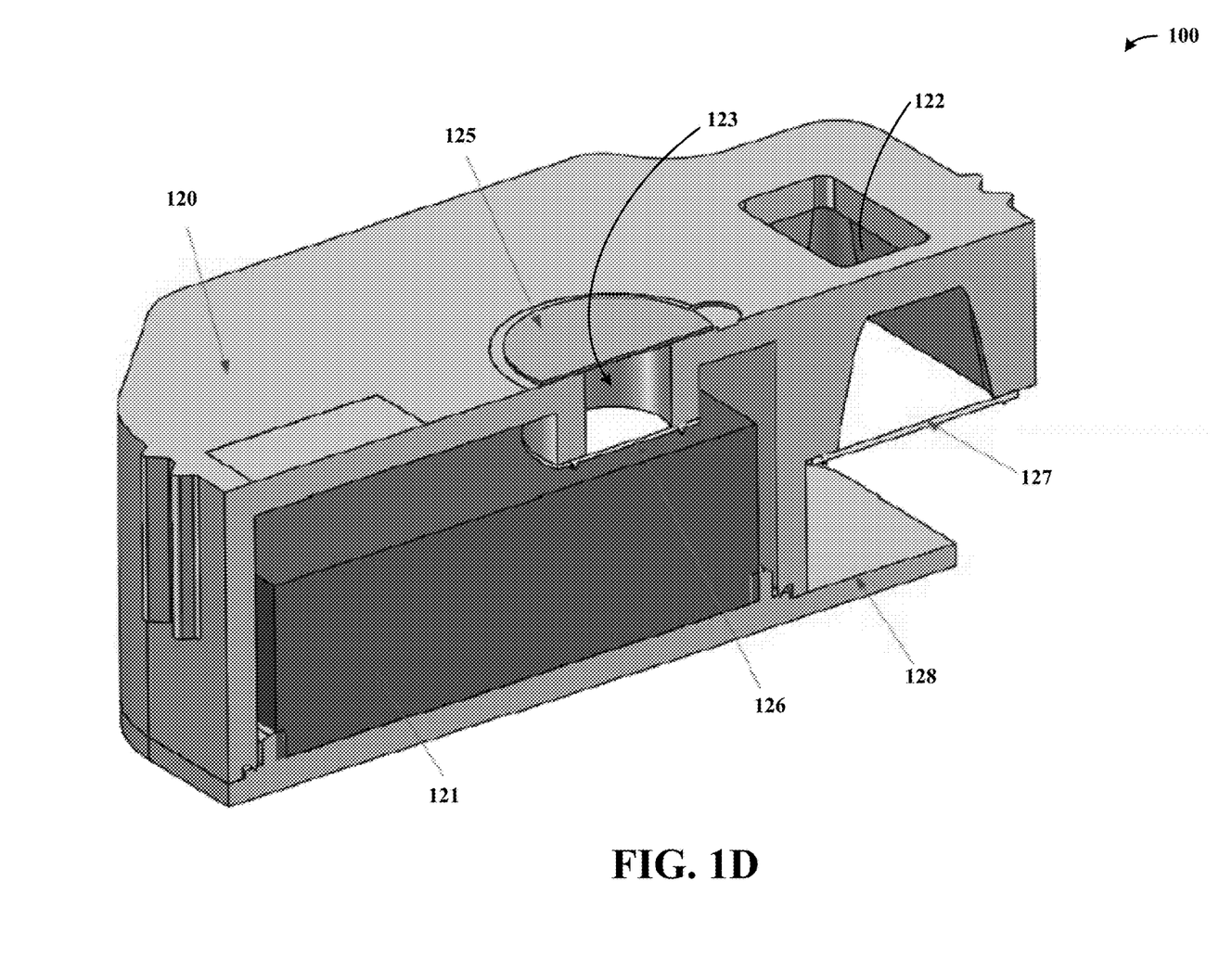
FIG. 1D shows another cut-away view of the desiccant chamber and related membranes.

FIG. 1D shows another cut-away view of the ECM 120, with the respective openings, seal, membranes and desiccant labeled as such, without placement into an enclosure. A lower surface 128 is amenable to affixing within an enclosure.

Figure 2A:
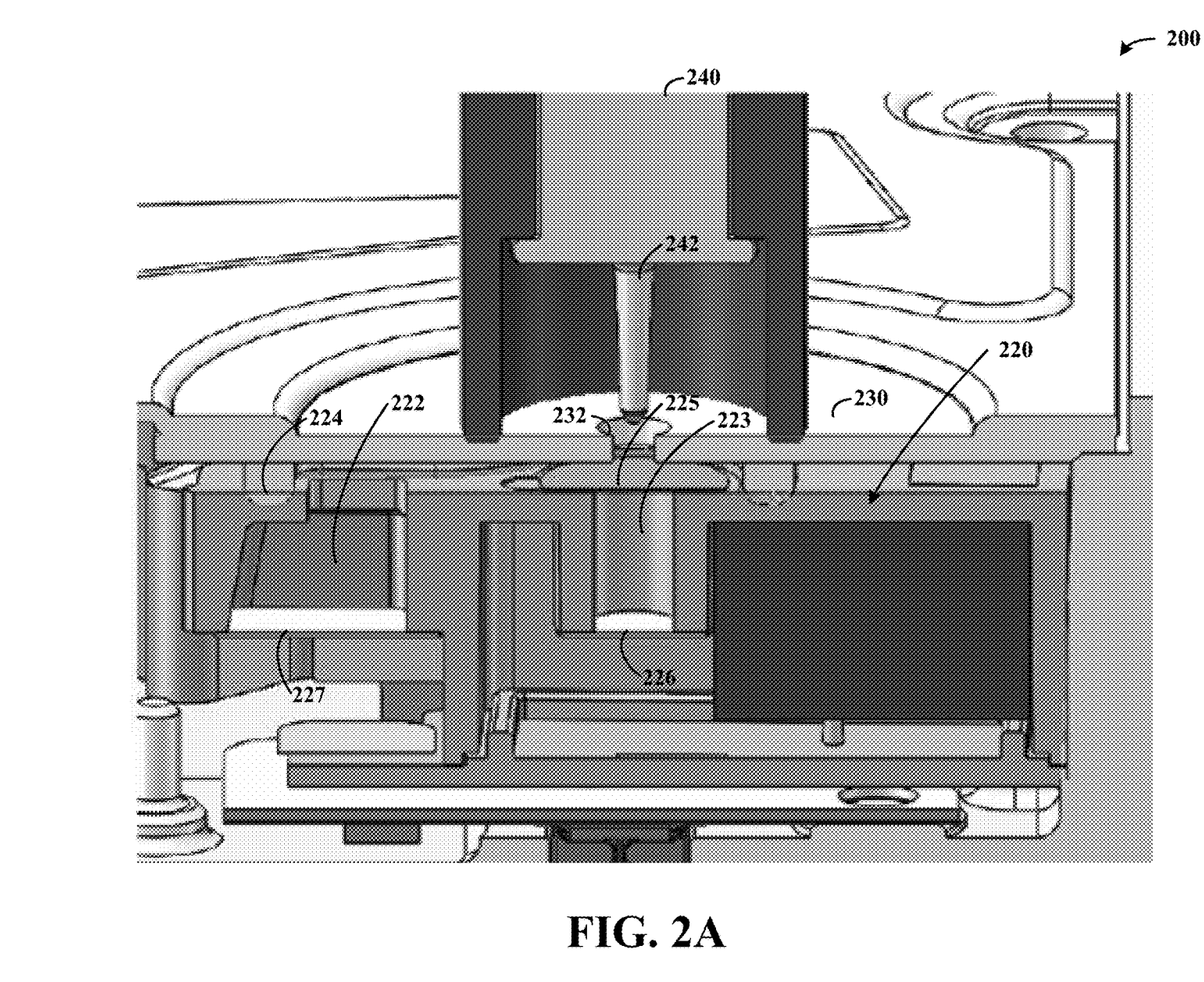
FIG. 2A shows the apparatus with a pin aligned for piercing a seal.
Figure 2B:
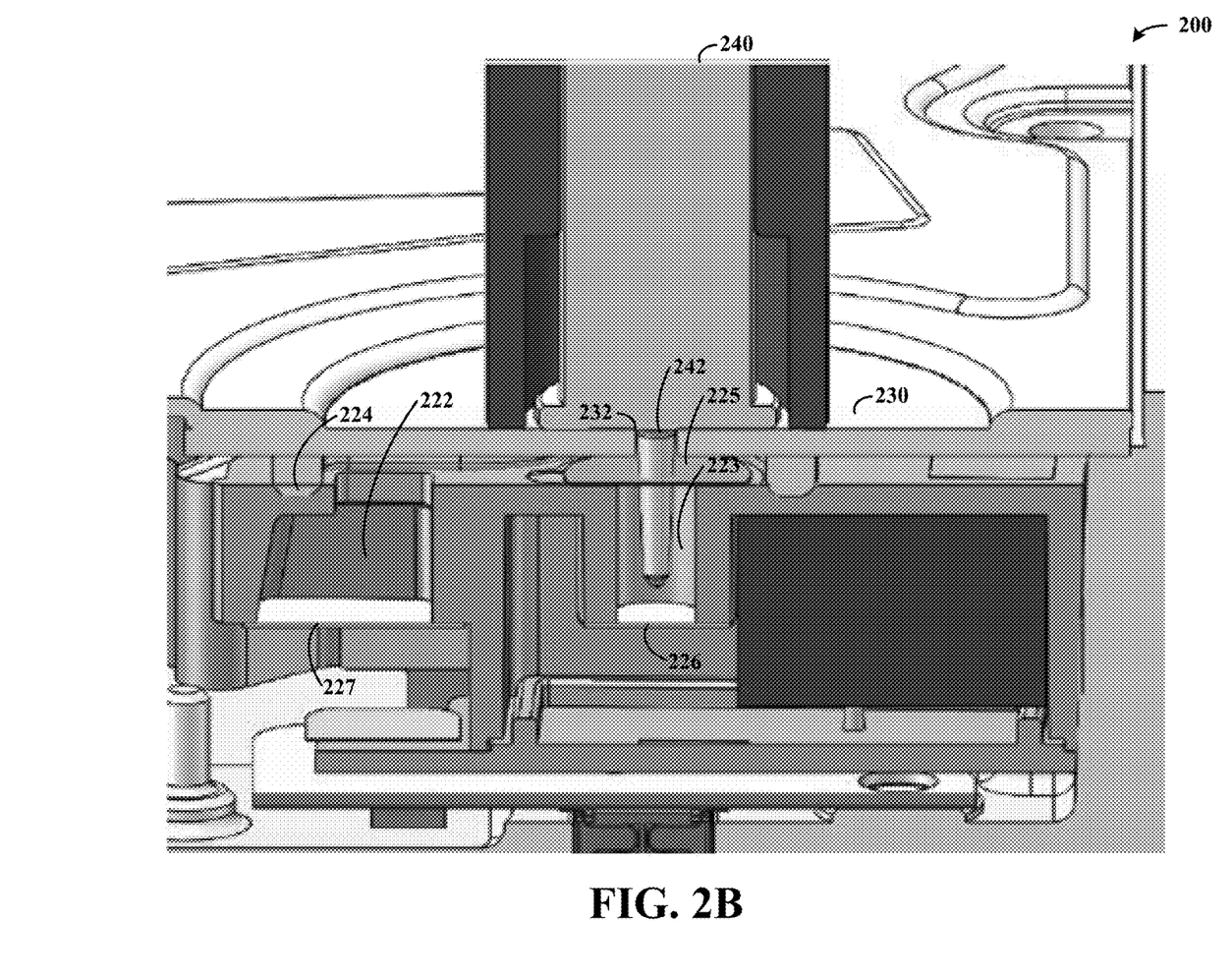
FIG. 2B shows the apparatus with the pin having pierced the seal.
Figure 2C:
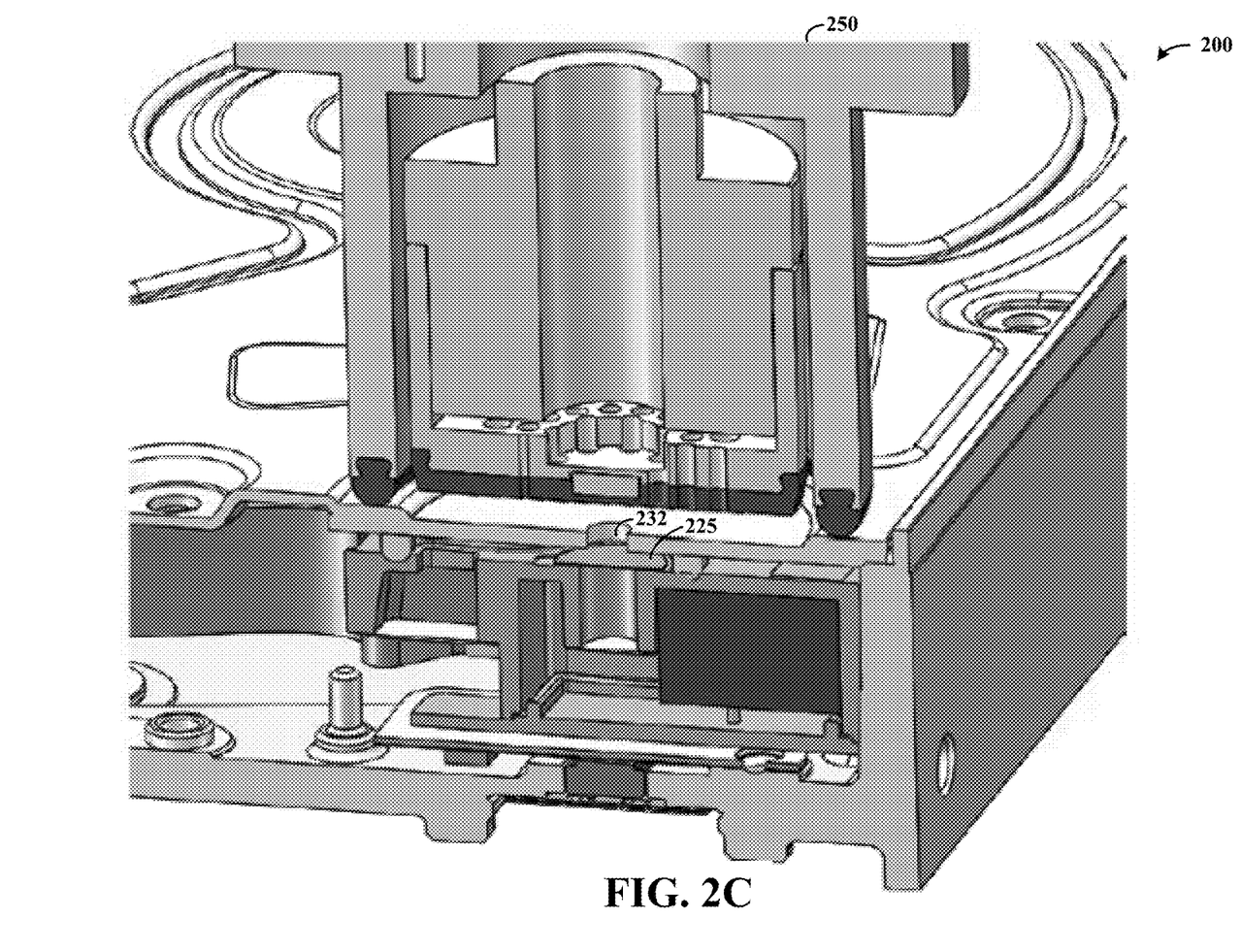
FIG. 2C shows the apparatus with an evacuation and fill component aligned thereto.

FIGS. 2A-2C show an apparatus 200 at various stages of operation involving puncturing of a desiccant chamber seal and evacuation and fill processes, as may be implemented in accordance with one or more embodiments. The apparatus 200 includes an ECM 220, which may be implemented with desiccant 221 in a chamber thereof, openings 222 and 223 in an upper surface of the ECM, gasket 224 around the openings on the upper surface of the ECM, a seal 225, and membranes 226 and 227. A mechanical punch 240 includes a pin 242 that is operable to pierce seal 225. The pin 242 as shown in FIG. 2A is aligned to the opening 232 and ready for piercing the seal 225. In FIG. 2B, the pin 242 has pierced the seal (but stopped short of the membrane 226).

In FIG. 2C, an evacuation and fill component 250 is aligned to the opening 232 for carrying out evacuation and fill, such as characterized with FIGS. 1B and 1C. This evacuation and fill can be carried out via opening 232 before puncturing the seal as in FIGS. 2A and 2B, or thereafter (seal 225 is shown intact, by way of example).

Based upon the above discussion and illustrations, those skilled in the art will readily recognize that various modifications and changes may be made to the present disclosure without strictly following the exemplary embodiments and applications illustrated and described herein. For example, different positioning of the respective openings in the ECM may be utilized to effect a similar process flow and sealing. One or more membranes may be omitted to suit particular applications, or positioned at different locations. Differently-shaped paths for evacuation and fill and/or subsequent moisture control may be utilized as well. The ECMs as shown may be built as part of a hard disc drive enclosure. Further, while various example materials, sizes and arrangements are shown in the figures and/or described, such aspects may be implemented in embodiments involving other materials, sizes or arrangements. Such modifications do not depart from the true spirit and scope of the present disclosure, including that set forth in the following claims.

What is claimed is:

1. An apparatus comprising:
a chamber;
a desiccant material contained within the chamber;
a gas channel extending from a first end adjacent the chamber to a second end;
at the first end of the gas channel, a first membrane configured and arranged to facilitate permeation of moisture-laden gas to and from the chamber;
at the second end of the gas channel, a second membrane configured and arranged to facilitate permeation of moisture-laden gas into and out of the gas channel for controlling humidity within an enclosure environment; and
a seal configured and arranged with the first and second membranes to:
in a first state, provide a seal in the gas channel that prevents the permeation of gas between the chamber and the enclosure environment, and
in a second state in which the seal is punctured, permit the permeation of gas between the chamber and the enclosure environment, via the respective first and second membranes.

2. The apparatus of claim 1, further including a port configured and arranged to, while the seal is in the first state, facilitate exhaustion of gas from the enclosure environment and filling of gas into the enclosure environment, via the second end of the gas channel and the second membrane.

3. The apparatus of claim 2, further including a mechanical punch configured and arranged to puncture the seal while the port is permanently sealed.

4. The apparatus of claim 1, wherein the first membrane is located between the seal and the chamber.

5. The apparatus of claim 1, wherein the first membrane is in a pathway between the seal and the chamber, the pathway having a length and width that is configured and arranged to accept a punch that is passed through the seal for puncturing the seal with the first membrane being offset from the seal by a distance that prevents contact of the punch with the first membrane.

6. The apparatus of claim 1, wherein:
the chamber is within an environmental control module (ECM) having an upper surface and including the respective membranes; and
the seal is affixed to the upper surface of the ECM.

7. The apparatus of claim 6, further including:
a gasket on the upper surface of the ECM and extending around the respective openings in the upper surface via which the gas channel extends; and
an enclosure lid on the gasket and configured and arranged with the gasket to define a sealed portion of the gas channel extending between the first and second membranes.

8. The apparatus of claim 7, wherein the ECM has a lower surface that defines a portion of the chamber, further including protrusions extending from the lower surface into the chamber and configured and arranged to engage with the desiccant to fix the desiccant in place.

9. The apparatus of claim 1, further including protrusions extending from an inner sidewall of chamber, the protrusions being configured and arranged to fix the desiccant in place by engaging with the desiccant.

10. The apparatus of claim 1, further including:
a hard disc drive enclosure configured and arranged to house the chamber, gas channel, membranes and seal; and
a hard disc drive in the enclosure.

11. An apparatus comprising:
an environmental control module (ECM) having:
a desiccant chamber having a desiccant material therein;
a first membrane in a pathway extending from the desiccant chamber through a first opening on an upper surface of the ECM, the first membrane being configured and arranged to pass moisture between the first opening and the desiccant chamber;
a second membrane remote from the first membrane and extending in a portion of the pathway extending from the second membrane to a second opening on the upper surface of the ECM, the second membrane being configured and arranged to pass moisture between the pathway and circuitry external to the ECM via the second opening;

a seal at the upper surface of the ECM and configured and arranged to seal the desiccant chamber and the first membrane in a portion of the pathway extending from the desiccant chamber;

a gasket on the upper surface and extending around the respective openings therein; and an enclosure cover on the gasket and configured and arranged with the gasket to define and seal the pathway between the desiccant chamber and the second membrane.

12. The apparatus of claim 11, wherein the enclosure cover has an opening therein located laterally within a perimeter of the gasket; and the ECM is configured and arranged with the enclosure cover and gasket to:

in a first state in which the seal is intact and hermetically seals the desiccant material in the desiccant chamber, provide an evacuation and fill path from the opening in the enclosure cover, past the gasket, through the second opening in the upper surface ECM and through the second membrane, and in a second state in which the seal has been broken, provide a sealed pathway extending from the desiccant in the desiccant chamber, respectively through the first membrane, the first opening, an area between the upper surface of the ECM and enclosure cover sealed by the gasket, the second opening and the second membrane.

13. The apparatus of claim 12, further including an external seal configured and arranged to hermetically seal the opening in the enclosure cover, after the seal on the upper surface of the ECM has been broken, and to therein seal the pathway between the first and second openings in the upper surface of the ECM.

14. The apparatus of claim 12, wherein the gasket is compressed between an upper surface of the ECM around the first and second openings in the upper surface, and forms a perimeter around a sealed region between the upper surface of the ECM and the enclosure cover.

15. The apparatus of claim 11, wherein the ECM includes a first channel portion of the pathway having a sidewall that extends upward from an inner surface of the desiccant chamber to the first opening in the upper surface of the ECM, the first membrane being within the first channel portion and the first channel portion having a length sufficient to permit puncturing of the seal on the upper surface of the ECM without contacting the first membrane.

16. The apparatus of claim 15, wherein the ECM includes a second channel portion of the pathway having a sidewall that extends downward from the second opening in the upper surface of the ECM to the second membrane, and which facilitates the passage of gas between the second channel portion with the sidewall and across the second membrane into an enclosure in which the ECM is mounted.

17. The apparatus of claim 11, wherein the ECM includes a second channel portion of the pathway having a sidewall that extends downward from the second opening in the upper surface of the ECM to the second membrane, and which facilitates the passage of gas between the second channel portion with the sidewall and across the second membrane into an enclosure in which the ECM is mounted.

18. A method comprising:

providing an enclosure having a data storage medium therein;

providing an environmental control module (ECM) in the enclosure, the ECM having:

a desiccant chamber having a desiccant material therein;

a first membrane in a pathway extending from the desiccant chamber through a first opening on an upper surface of the ECM, the first membrane being configured and arranged to pass moisture between the first opening and the desiccant chamber;

a second membrane remote from the first membrane and extending in a portion of the pathway extending from the second membrane to a second opening on the upper surface of the ECM, the second membrane being configured and arranged to pass moisture between the pathway and circuitry external to the ECM via the second opening;

a seal at the upper surface of the ECM and configured and arranged to seal the desiccant chamber and the first membrane in a portion of the pathway extending from the desiccant chamber;

providing a gasket on the upper surface of the ECM and extending around the respective openings therein; and providing an enclosure cover that seals the enclosure and that is configured and arranged with the gasket to define and seal the pathway between the desiccant chamber and the second membrane.

19. The method of claim 18, wherein the enclosure cover includes an opening positioned with a perimeter of the gasket, further including:

creating a permeability path between the desiccant chamber and the enclosure by puncturing the seal;

evacuating and filling the enclosure by exhausting gas from the enclosure via the opening and the second membrane and subsequently filling the enclosure with an inert gas; and sealing the opening in the enclosure cover.

20. The method of claim 18, wherein the enclosure cover includes an opening positioned with a perimeter of the gasket, further including:

evacuating and filling the enclosure by exhausting gas from the enclosure via the opening and the second membrane and subsequently filling the enclosure with an inert gas, while using the seal at the upper surface of the ECM to prevent permeation of gas or humidity into or out of the desiccant chamber;

after evacuating the enclosure, creating a permeability path between the desiccant chamber and the enclosure by puncturing the seal; and sealing the opening in the enclosure cover.

* * * * *